US011007759B2

(12) United States Patent
Schaefer et al.

(10) Patent No.: US 11,007,759 B2
(45) Date of Patent: May 18, 2021

(54) METHOD FOR PRODUCING A COMPOSITE MATERIAL AND A COMPOSITE MATERIAL

(71) Applicant: Konrad Hornschuch AG, Weissbach (DE)

(72) Inventors: Philipp Schaefer, Hannover (DE); Birgit Kammerer, Kupferzell (DE); Jesse James Smith, Hong Kong (CN)

(73) Assignee: Konrad Hornschuch AG, Weissbach (DE)

(*) Notice: Subject to any disclaimer, the term of this patent is extended or adjusted under 35 U.S.C. 154(b) by 239 days.

(21) Appl. No.: 16/062,642

(22) PCT Filed: Dec. 19, 2016

(86) PCT No.: PCT/EP2016/081656
§ 371 (c)(1),
(2) Date: Jun. 15, 2018

(87) PCT Pub. No.: WO2017/103247
PCT Pub. Date: Jun. 22, 2017

(65) Prior Publication Data
US 2019/0009508 A1 Jan. 10, 2019

(30) Foreign Application Priority Data
Dec. 18, 2015 (AT) .............................. A 51080/2015

(51) Int. Cl.
B32B 27/12 (2006.01)
B32B 5/18 (2006.01)
(Continued)

(52) U.S. Cl.
CPC ................ B32B 27/12 (2013.01); B32B 3/14 (2013.01); B32B 3/266 (2013.01); B32B 5/022 (2013.01);
(Continued)

(58) Field of Classification Search
CPC . B32B 2255/26; B32B 2260/02; B32B 27/12; B32B 37/12; B32B 37/15;
(Continued)

(56) References Cited

U.S. PATENT DOCUMENTS 4,370,374 A  1/1983 Raabe et al.
5,521,273 A  5/1996 Yilgor
(Continued)

FOREIGN PATENT DOCUMENTS

DE   102014110814 A1   9/2015
EP      0002465 A1    6/1979
(Continued)

OTHER PUBLICATIONS

Dormish, J.F. ,"Q&A about Polyurethanes" in Adhesives Magazine, Jan. 4, 2013, accessed online on Jul. 19, 2020 at https://www.adhesivesmag.com/articles/91625-qa-about-polyurethane.*
(Continued)

Primary Examiner — Philip C Tucker
Assistant Examiner — Jimmy R Smith, Jr.
(74) Attorney, Agent, or Firm — David L. Cate; Gregory Adams

(57) ABSTRACT

The invention relates to a process for producing a coating film, optionally in the form of sheets or slabs, especially for the coating of a carrier layer (3), optionally textile materials and/or peelable polyurethane foams and/or a textile carrier layer (3), wherein the coating film (100) has an optionally multilayer upper layer (1) and a bonding layer (2) bonded thereto and optionally having multiple layers (2', 2") for bonding to the carrier layer (3).
It is envisaged in accordance with the invention that
the bonding layer (2) creates an uncrosslinked, polyurethane layer having thermoplastic properties and having a thickness between 0.080 and 0.500 mm, preferably
(Continued)

between 0.200 and 0.500, especially between 0.120 and 0.180 mm, and is bonded to the upper layer (1), and the upper layer (1) is a polyurethane layer which has a one-layer or preferably two-layer structure with an outer layer (1') and inner layer (1") and does not have thermoplastic properties, or a non-thermoplastic polyurethane layer which is amorphous or has a predominantly amorphous structure, said polyurethane layer being thinner than the bonding layer (2).

8 Claims, 3 Drawing Sheets

(51) Int. Cl.
| | | |
|---|---|---|
| *B32B 7/02* | (2019.01) | |
| *B32B 7/12* | (2006.01) | |
| *B32B 27/08* | (2006.01) | |
| *B32B 27/40* | (2006.01) | |
| *B32B 37/00* | (2006.01) | |
| *B32B 9/02* | (2006.01) | |
| *B32B 5/24* | (2006.01) | |
| *B32B 5/02* | (2006.01) | |
| *B32B 38/06* | (2006.01) | |
| *B32B 3/26* | (2006.01) | |
| *B60N 2/58* | (2006.01) | |
| *B32B 3/14* | (2006.01) | |
| *B32B 7/06* | (2019.01) | |
| *B32B 37/12* | (2006.01) | |
| *B32B 37/15* | (2006.01) | |

(52) U.S. Cl.
CPC .............. *B32B 5/024* (2013.01); *B32B 5/026* (2013.01); *B32B 5/028* (2013.01); *B32B 5/18* (2013.01); *B32B 5/24* (2013.01); *B32B 7/02* (2013.01); *B32B 7/06* (2013.01); *B32B 7/12* (2013.01); *B32B 9/025* (2013.01); *B32B 27/08* (2013.01); *B32B 27/40* (2013.01); *B32B 37/025* (2013.01); *B32B 37/12* (2013.01); *B32B 37/15* (2013.01); *B32B 38/06* (2013.01); *B60N 2/58* (2013.01); *B32B 2250/24* (2013.01); *B32B 2255/02* (2013.01); *B32B 2255/10* (2013.01); *B32B 2255/26* (2013.01); *B32B 2260/02* (2013.01); *B32B 2260/021* (2013.01); *B32B 2260/046* (2013.01); *B32B 2262/0276* (2013.01); *B32B 2262/062* (2013.01); *B32B 2266/0278* (2013.01); *B32B 2305/022* (2013.01); *B32B 2305/073* (2013.01); *B32B 2305/18* (2013.01); *B32B 2305/186* (2013.01); *B32B 2305/188* (2013.01); *B32B 2305/20* (2013.01); *B32B 2305/72* (2013.01); *B32B 2305/77* (2013.01); *B32B 2307/4026* (2013.01); *B32B 2307/412* (2013.01); *B32B 2307/54* (2013.01); *B32B 2307/552* (2013.01); *B32B 2307/5825* (2013.01); *B32B 2307/71* (2013.01); *B32B 2307/712* (2013.01); *B32B 2307/734* (2013.01); *B32B 2309/02* (2013.01); *B32B 2310/0843* (2013.01); *B32B 2317/10* (2013.01); *B32B 2367/00* (2013.01); *B32B 2375/00* (2013.01); *B32B 2437/02* (2013.01); *B32B 2601/00* (2013.01); *B32B 2605/003* (2013.01); *B32B 2605/08* (2013.01)

(58) Field of Classification Search
CPC .............. B32B 7/12; B32B 2266/0278; B32B 2375/00; B32B 27/40; B32B 7/02
See application file for complete search history.

(56) References Cited

U.S. PATENT DOCUMENTS

| | | |
|---|---|---|
| 5,876,852 A | 3/1999 | Hargarter et al. |
| 2002/0119306 A1 | 8/2002 | Enewoldsen et al. |
| 2007/0082176 A1* | 4/2007 | Schaefer ................ B32B 27/40 |
| | | 428/151 |
| 2008/0214727 A1* | 9/2008 | Pohl ........................ D06N 3/14 |
| | | 524/589 |
| 2010/0075559 A1 | 3/2010 | Hatori et al. |
| 2010/0092726 A1* | 4/2010 | Schuette ................ B32B 27/02 |
| | | 428/141 |
| 2011/0244243 A1 | 10/2011 | Uemura et al. |
| 2013/0089718 A1 | 4/2013 | Schaefer et al. |
| 2015/0299944 A1 | 10/2015 | Sigiura et al. |

FOREIGN PATENT DOCUMENTS

| | | |
|---|---|---|
| EP | 0024740 A1 | 3/1981 |
| EP | 0754543 A2 | 1/1997 |
| EP | 0800916 A2 | 10/1997 |
| EP | 1234660 A1 | 8/2002 |
| EP | 1835068 A1 | 9/2007 |
| WO | 2005047549 A1 | 5/2005 |
| WO | 2008077785 A1 | 7/2008 |
| WO | 2011157279 A1 | 12/2011 |

OTHER PUBLICATIONS

Ludwig Kofler et al. / Über eine Heizbank zur raschen Bestimmung des Schmelzpunktes / Jan. 12, 1949.

* cited by examiner

METHOD FOR PRODUCING A COMPOSITE MATERIAL AND A COMPOSITE MATERIAL

The invention relates to a process according to the preamble of claim 1. Coating films of this kind can be produced in the form of continuous sheets and wound up into rolls for later use. If coating films of this kind are produced in the form of slabs of comparatively small format, these can be stacked and stored. The coating films of this kind especially serve for coating of textile materials or carrier layers, where the coating films are applied either over the whole area of the carrier layer or a precut blank or else are applied only over partial regions of this carrier layer or of the precut blank. The carrier films or precut blanks provided with the coating film are processed further.

WO 2008/077785 A1 discloses a composite material including a thermoplastic nonwoven made of polyurethane fibers as carrier layer. This construction has the disadvantage that the composite material is thermoplastic and collapses, i.e. becomes thin and hardens, at a pressure of 1 kg/cm$^2$ at a temperature of 140° C. There is no penetration of the middle layer, i.e. of a thermoplastic TPU film into the carrier layer; no textile carrier is provided.

These aims are achieved by the process of the invention of the type mentioned above in that the bonding layer creates an uncrosslinked, polyurethane layer having thermoplastic properties and having a thickness between 0.080 and 0.500 mm, preferably between 0.100 and 0.500 mm, especially between 0.120 and 0.180 mm, and is bonded to the upper layer, and the upper layer is a polyurethane layer which has a one-layer or preferably two-layer structure with an outer layer and inner layer and does not have thermoplastic properties, or a non-thermoplastic polyurethane layer which is amorphous or has a predominantly amorphous structure, said polyurethane layer being thinner than the bonding layer.

The aim of the invention is to create a coating film which is adaptable to different end uses in accordance with its thickness and is extremely durable. It is to have excellent fatigue bending characteristics and high tensile strength, and is to be bondable in a simple manner to a textile carrier layer, for example by application of heat and/or pressure. The production process is to take account of the plasticity of the materials and lead to optimal bonding of the layers.

The composite material of the invention is not to undergo any change in its properties at temperatures between 90 and 145° C., and at pressures as occur in footwear production, for example, or in the case of processing in the interior of automobiles, or else as occur in practice, for example in steering wheels or dashboards in the region of the heating vents. The same applies to the test of lightfastness according to DIN EN ISO 105-B02 and the alternating conditions test.

Moreover, the upper layer shall not become fluid and tacky at elevated temperatures in order to avoid skin injury. Since thermo plastic polyurethanes are known to be producible only over a broad melting range, the composite material of WO 2008/077785 A1 has great disadvantages and cannot be used, for example, either for safety footwear or for automobile interior trim. In the case of heated storage at 145° C., the shrinkage of the material changes by more than 10% and, in the simultaneous presence of pressure, it loses its strength and, after cooling, gives rise to a thin, stiff, film-like structure, essentially caused by melting of the fibers of the nonwoven of the carrier layer and loss of the nonwoven character.

The invention further relates to a coating film according to the preamble of claim 7. This coating film achieves the objects demanded of it and avoids the drawbacks of the coating films known from the prior art.

The invention further relates to a process according to the preamble of claim 15, by which a composite material is produced by bonding the coating film of the invention to a textile carrier. A process of this kind which is performable in a simple manner and leads to optimal quality of the composite material is characterized in that the bonding layer creates an uncrosslinked, polyurethane layer having thermoplastic properties and having a thickness between 0.080 and 0.500 mm, preferably between 0.100 and 0.500 mm, especially between 0.120 and 0.180 mm, and is bonded to the upper layer, and the upper layer is a polyurethane layer which has a one-layer or preferably two-layer structure with an outer layer and inner layer and does not have thermoplastic properties, or a non-thermoplastic polyurethane layer which is amorphous or has a predominantly amorphous structure, said polyurethane layer being thinner than the bonding layer. Finally, the invention also relates to a composite material which is advantageously producible by the process of the invention and in practice has very high durability, soil insensitivity, good tear and elongation characteristics, and high fatigue bending resistance.

The invention thus encompasses a process and a coating film for partial coating of textile materials or precut textile blanks, for example for the interior trim of automobiles or seat covers for automobiles. This end use is based on the particular object of reinforcing materials, especially textiles as used for car seat covers inter alia, at particularly highly stressed sites, for example the side bolsters, and if appropriate simultaneously providing them with additional functions, such as a different color and/or structure than the cover material. It is thus also possible to improve the grip properties at the desired sites of the cover material and partially improve the abrasion resistance and the soiling characteristics. The majority of all car seats has a textile cover material based on a polyester fabric, often also with a component of cotton fibers.

It is known that parts of the seat that are subject to particular stress, for example the side bolsters, headrests or else outer parts of the backrest, can be covered with a material different than the textile cover material, for example leather, but in particular synthetic leather. Synthetic leather is understood here to mean a textile carrier, such as a weave or knit, with a PVC or polyurethane coating that has been applied to the textile carrier in liquid or pasty form directly or in the reverse process.

In the production of seat covers, a precut textile blank is bonded to a leather or synthetic leather precut blank by means of stitched seams. The textile regions of the seat in particular that come into contact with perspiration, sebum or other impurities are rapidly soiled, become unsightly and can be protected by combination processing. The production of a seat cover from different materials by the multiple punching and stitching operations is very complex. In most cases, different material combinations such as leather/cloth or synthetic leather/cloth, by virtue of their different expansion characteristics and their different resilience characteristics, lead to creasing after a short time, which has to be prevented. A further disadvantage is that the abrasion-resistant and relatively soil-insensitive materials such as leather or synthetic leather are about twice as heavy as the textile cover material. However, the thicker leather or synthetic leather overlays with their seams are frequently also detrimental to comfort.

One object of the present invention is thus that of providing a process for producing seat covers in which the disadvantages mentioned do not occur.

It is advantageous when the bonding layer bonded to the upper layer is a thermoplastic polyurethane layer
- having a Kofler bench melting point between 95 and 165° C., preferably between 110 and 140° C.,
- and/or having a crystalline or semicrystalline structure,
- and/or having a Shore A hardness between 70 and 98, preferably between 70 and 88,
- and/or based on aliphatic and/or aromatic polyesterpolyurethane and/or polyetherpolyurethane and/or
- containing up to 5% by weight of color pigments or being transparent, and/or having fatigue bending characteristics according to DIN EN ISO 5402 of at least 125 000 bending operations at standard temperature.

The thermoplastic bonding layer advantageously has a comparable hardness, especially the same hardness as the upper layer, and owing to its thermoplastic characteristics can easily and rapidly be bonded to the carrier layer. Deviations in hardness of up to ±10% are possible. The bonding layer has good flexibility and may also contain color pigments for formation of patterns.

For the bonding of the upper layer and the bonding layer, it may be appropriate when the upper layer is bonded, directly or using an adhesive layer consisting of a crosslinked polyurethane dispersion having a thickness of 0.005 to 0.010 mm, to the thermoplastic bonding layer which is applied to the upper layer and/or the bonding layer. Such an adhesive layer does not impair the properties of the bond of upper layer and bonding layer, but may be advantageous for the holding of the layers together or for their strength and bending properties.

For the upper layer, it is advantageous when the upper layer takes the form of a layer of an aliphatic crosslinked solidified polyurethane dispersion based on polycarbonate, polyester and/or polyether and/or mixtures thereof and has a thickness between 0.0400 and 0.0950 mm, preferably between 0.050 and 0.080 mm, and/or
- is unmeltable because its melting point is above 250° C. or above its breakdown point, and/or
- is structured, optionally in a velour-like or nubuck-like manner or in the manner of a leather grain or with a geometric structure, or has the appearance of textile material or a carbon fiber fabric or a technical appearance and/or
- contains between 2.5% and 15% by weight of color pigments and/or has a multicolor print on its surface, with a thickness of less than 0.010 mm.

The upper layer is unmeltable because its melting point is above its breakdown point and can be provided with a pattern in the production thereof on a corresponding negative template or a correspondingly shaped substrate. The upper layer may also contain color pigments for formation of patterns. In spite of the upper layer being in crosslinked or solidified form, it is possible to emboss the hot surface of the coating film after it has been mounted on an appropriate carrier material since the bonding layer is thermoplastic and can be subjected to permanent embossment.

For reinforcement, a laid scrim made of synthetic fibers having a basis weight between 5 and 20 g/m² may be inserted between the thermoplastic bonding layer and the upper layer prior to the bonding of these layers.

For some applications, it is advantageous when 4% to 20% by weight of flame-retardant additives, optionally aluminum hydroxide, is added to the bonding layer and/or the upper layer.

For practical purposes, especially for abrasion resistance and soil sensitivity, it has been found that it is advantageous for particular end uses when the upper layer and the bonding layer are formed with the same Shore A hardness and/or
- when the upper layer and the adhesive layer are formed together with a smaller thickness than the bonding layer, and/or
- when the adhesive layer is formed with a basis weight of 5 to 20 g/m² and/or a thickness of 0.002 to 0.010 mm, and/or
- when a finish layer having a maximum thickness of 0.010 mm is applied to the outer surface of the upper layer and/or when color pigments having different colors are added to the two layers that form the upper layer and/or to the bonding layer and/or when an adhesive layer having contact and/or pressure-sensitive adhesive properties prior to crosslinking thereof is used and, after removal of water, is bonded to the thermoplastic polyurethane film of the bonding layer.

One possible advantageous procedure in the production of the coating film is when the thermoplastic polyurethane film that forms the bonding layer, after it has been produced by extrusion, before it has been bonded to the upper layer, is placed onto a release paper or a polyolefin film and/or when the adhesive layer which has contact or pressure-sensitive adhesive properties prior to crosslinking thereof is applied to the thermoplastic polyurethane film of the bonding layer and, after removal of water, the upper layer is applied or placed onto the bonding layer. It is also possible that the upper layer is applied to, i.e. bonded to and solidified with, the bonding layer directly in the form of a polyurethane dispersion, and then the bonding layer is bonded to the carrier layer and the upper layer is then embossed by means of heat and pressure.

In principle, it may be the case that the non-thermoplastic upper layer has been bonded, directly or by means of an adhesive layer of a crosslinked polyurethane dispersion having a thickness of 0.005 to 0.010 mm, to the thermoplastic bonding layer. For patterning of the coating film of the invention, it may be the case that the two layers that form the upper layer and/or the bonding layer have different-colored color pigments and/or that at least in partial regions of the upper layer, recesses that penetrate the outer layer of the upper layer or the outer layer and the inner layer of the upper layer and extend into the bonding layer have been formed with a laser. When the color pigments present in the upper layer and in the bonding layer have different colors, it is possible in this way, by removal of material of the upper layer and optionally also of parts of the bonding layer, to form a pattern by choice of the position and shape of the recesses.

It is particularly advantageous that this coating film of the invention can be stored and subjected to a later use, for which it is necessary merely to correspondingly activate or to heat the bonding layer. The bonding layer may be applied here over the full surface of a carrier layer or cover just partial regions of the carrier layer. This is advantageous especially when textile materials are to be coated, specifically at the sites where this material is subject to particularly severe wear.

It is advantageous when the coating film has optionally been applied or attached to the bonding layer and the upper layer that has been applied thereto only in partial regions of the carrier layer which is optionally composed of multiple, optionally stitched pieces, optionally covering abutment regions of the carrier layer, and/or to a carrier layer in the form of a precut blank.

Coating films are particularly advantageously usable for footwear, safety footwear, seat covers, automobile interior trim, consoles in motor vehicles, furniture parts, child seats and patient beds.

The invention also relates to a process for producing a composite material comprising a textile carrier layer which is at least partly coated with a coating film of the invention.

A composite material of this kind could also be produced by employing a textile carrier layer, for example a synthetic leather, having a textile carrier layer to which a surface layer is applied, the composition of which corresponds to the bonding layer used in accordance with the invention. In this way, it would be possible to produce a composite material of the invention by applying the upper layer. However, it is preferable in accordance with the invention to apply the coating film directly to the textile carrier material and to bond it directly thereto. For this purpose, a composite of the bonding layer and the upper layer is applied to such a weave, knit or polyester nonwoven, or, in a successive manner, first the bonding layer is applied to the textile material and then the upper layer to the bonding layer bonded to the textile material.

As already mentioned, a coating film of the invention is applied to the textile carrier, which exhibits the features of claims 7 to 14 and has been produced using features 1 to 6.

It is possible that recesses that extend as far as the carrier layer and/or into it are produced in the upper layer and optionally in the bonding layer by material removal by means of laser. Good durability of the composite material is the result when polyester fibers optionally strengthened with cotton fibers are used for the textile material of the carrier layer. Good attachment of the bonding layer to the carrier layer is the result when the thermoplastic bonding layer is indented into, and hence anchored within, the carrier layer formed by a textile material by about 0.01 mm to 0.15 mm, preferably about 0.01 mm to 0.06 mm, when the bonding layer and the carrier layer are joined together. For a good bond, it is appropriate when textile materials that are free of silicones, waxes or separating agents and/or consist of sparingly flammable fibers are used.

Ultimately, by production of recesses in the composite material and/or in the coating film, it is possible to proceed in such a way that the number of recesses is chosen such that the composite material has a water vapor permeability of greater than 1 mg/cm$^2$ h, preferably greater than 2 mg/cm$^2$ h.

One way of producing the composite material is that the thermoplastic polyurethane layer that forms the bonding layer, after it has been produced by extrusion, before it has been bonded to the upper layer, is temporarily placed onto a release paper or a polyolefin film and/or that the adhesive layer which has contact or pressure-sensitive adhesive properties prior to crosslinking thereof is applied to the thermoplastic polyurethane film of the bonding layer and, after removal of water, the upper layer is applied or placed onto the bonding layer. It is additionally possible that, especially for formation of a leather substitute material, the upper layer is applied to a structured substrate, preferably silicone template or release paper, and the bonding layer that has optionally already been bonded to the carrier layer is applied thereto, or that, especially for formation of a leather substitute material in sheet form, a textile carrier layer in sheet format is bonded to the bonding layer with supply of heat and pressure or by use of a contact or pressure-sensitive adhesive, and that, on the topside thereof, direct coating is effected with a dispersion to form an upper layer which, after solidification, is embossed by removal of water by means of heat, at a temperature between 90 and 160° C. and under pressure or by means of heat in a vacuum method. It may be advantageous when the bonding layer is applied to the carrier layer together with the upper layer and the layers are bonded with application of heat and/or pressure.

Finally, the invention also relates to a composite material having an upper layer, a bonding layer and a carrier layer, wherein the upper layer and the bonding layer are formed or realized by a coating film produced in accordance with the invention or having the features of the invention.

It is advantageous for the flexibility and extensibility of the composite material when the thermoplastic bonding layer has been introduced or indented into, and anchored within, the carrier layer formed by a textile material by about 0.010 to 0.15 mm, preferably about 0.01 mm to about 0.060 mm, preferably without having penetrated into the interstitial spaces between the yarn fibers.

The bonding layer 2 and the upper layer are inextricably bonded to one another, optionally via the thin adhesive layer 4. This adhesive layer 4 may optionally comprise polyisocyanates as crosslinkers. A laid scrim 40 made of synthetic fibers may be embedded between the bonding layer 2 and the upper layer 1.

The upper layer 1 consisting of two layers 1', 1" may be formed on a negatively structured substrate, for example a silicone rubber template or a release paper. In this case, the layer 1' is first formed on the substrate and the layer 1" is applied thereto. For creation of a seat cover, especially for motor vehicles, these seat covers may consist of different textile materials by stitching of different precut parts. For a seat material web, for example, thicker, higher-value textile materials are used, whereas it is possible to use thinner, less costly textiles for the side bolsters, but these, after bonding to a coating film of the invention, have approximately the thickness of the higher-value textile material and additionally also have excellent mechanical, physical and use properties.

For creation of a composite material of the invention or of a coated precut blank, it is possible to place the coating film, present in the form of roll material at best, or the coating film still present on a release paper onto the textile material directly after production thereof, and optionally to create a composite material in a heatable plate press or roll press. Plate presses are a preferred option, where the upper and lower heating plates have a controllable temperature between 100 and 180° C.; the pressure to be expended is controllable between 0.5 and 6 bar/cm$^2$. Typically, the textile material is arranged at the bottom in the press and the coating film of the invention is placed onto this material. The dwell time, i.e. the pressing operation, is about 10 seconds. After this time has passed, the composite material can be removed from the press and, after cooling down to room temperature, the separation force for the bonded materials is between 10 and 20 N/cm. On viewing a section image of the composite material of the invention, it has been found that the material of the bonding layer plasticized by the effect of the temperature has penetrated into the textile material by about 0.01 to 0.15 mm, preferably by 0.01 to 0.06 mm, and is anchored therein, i.e. bonded to the material. There has been no change here in the surface layer, a structured upper layer 1.

It is possible to provide a coarsely structured textile material, made of polyester fibers for example, with a coating film 100 having a thickness of 0.15 mm, in such a way that, after the bonding of the coating film 100 to the textile material, the structure of the textile material becomes visible in attenuated form on the surface of the upper layer 1 of the coating film 100.

It is possible to avoid filling of the interstitial spaces between the yarns of the polyurethane layer of the coating film that are used in the textile material or the carrier layer, which avoids hardening of the textile carrier material or of the overall composite material. This can be achieved in accordance with the invention when the bonding layer 2 has a high melt viscosity. It is also important that the layer has a hardness between 65 and 90 Shore A, and advantageously has a semicrystalline or crystalline structure.

The thin water-repellent upper finish layer contributes to a favorable effect on the wet properties of the textile material, and hence no changes can occur in the bond between the textile material and the thermoplastic bonding layer 2.

It is advantageous when, in the case of partial coating of a precut blank 300, the film is not thicker than 0.08 mm to 0.16 mm. It may be advantageous here when the bonding layer more than 40% and up to 80% of its thickness, under some circumstances even entirely or completely, is permanently pressed into the carrier layer 3, where the melt viscosity of the coating film or of the bonding layer 2 is chosen such that the material of the bonding layer 2 penetrates between the cavities in the textile material or weave, but not into the fine cavities of the yarns or into the yarns from which the textile material has been manufactured.

It is particularly advantageous when the upper layer 1 and the bonding layer 2 have about the same thickness ±10% and/or have about the same Shore A hardness ±10%. The best results are achieved when, in the hot pressing, the bonding layer penetrates completely or virtually completely into the textile carrier material or into the carrier layer 3, but without filling the cavities within the yarns used.

The bonding layer 2 is a crystalline or semicrystalline polyurethane layer, especially having more than 50% by weight of crystalline constituents, and may consist or be formed from aliphatic and/or aromatic polyurethane.

In the case of production of composite materials, especially in the form of sheet material, it is also possible to produce the upper layer 1 on a substrate and to apply a polyurethane dispersion having a pasty structure as lamination material as bonding layer 2 to this upper layer 1. The textile carrier, i.e. the carrier layer 3, is applied to and pressed onto this lamination material in pasty form, i.e. no longer in fluid form. It should likewise be noted here that the lamination material is so pasty that it does not penetrate between the fine cavities of the yarns, i.e. the textile material cannot display any wicking action with respect to the lamination material. In the case of such a procedure, the penetration of the polyurethane layer that forms the bonding layer 2 into the weave can be determined exactly. More particularly, a lamination material having thixotrope-like characteristics is used.

In practice, it is found that uncoated textile materials have the same softness as textile materials coated in accordance with the invention, although the service life, soil sensitivity and further properties of the coated textile material should be set at a higher level than those of the uncoated material. It may be particularly advantageous when the coating film 100, in its edge regions, merges seamlessly or virtually directly into the uncoated textile material 3, especially also when 50% of the thickness of the bonding layer 2 is anchored in the textile fabric.

The advantage of the procedure of the invention is that the coating film 100 can be applied to the textile material directly without application of an adhesive or primer and there is optimal anchoring in the textile material through penetration of the softened thermoplastic material of the bonding layer 2. This avoids hardening and a decrease in the tear propagation resistance. By contrast with polyurethane dispersions which are applied to the textile carrier for bonding, the procedure of the invention also leads to very high bondability in the wet state. In long-term use as well, they retain their bondability, which is between 10 and 20 N/cm, even after storage of the material in water for 24 hours. In the case of conventional composite materials which have textile material bonded to an upper polyurethane layer by using primers and/or polyurethane dispersion adhesives that are applied to the textile material, there is a reduction in bondability after storage in water of the layer applied for 24 hours by 60% in some cases.

The advantage of the coating film 100 or procedure of the invention is that it is possible to use a crystalline or semicrystalline bonding layer 2 which can be indented into the carrier layer 3 in the plastified or still non-fluid or virtually fluid or pasty state. This material, by contrast with conventional dispersions, does not include any emulsifiers and, even after storage in a water bath for 72 hours, absorbs less than 5% by weight of water, if any.

Since the upper layer 1 is non-thermoplastic and heat-resistant, it is not altered in a disruptive manner, if at all, when employed in the coating material under hot conditions and pressure. For this reason, it is advantageously created from a crosslinked or predominantly amorphous polyurethane dispersion based on polyether and/or polyester. The surface structure of the upper layer 1 is preferably formed in situ in the course of the solidification of the dispersion on a negatively structured template or by direct coating of the bonding layer 2 with the upper layer 1 followed by hot embossing.

Shore A hardness is always measured by using the respective material to produce a test specimen of dimensions prescribed for Shore A hardness measurement and analyzing it.

FIG. 4 and

Figure 5:
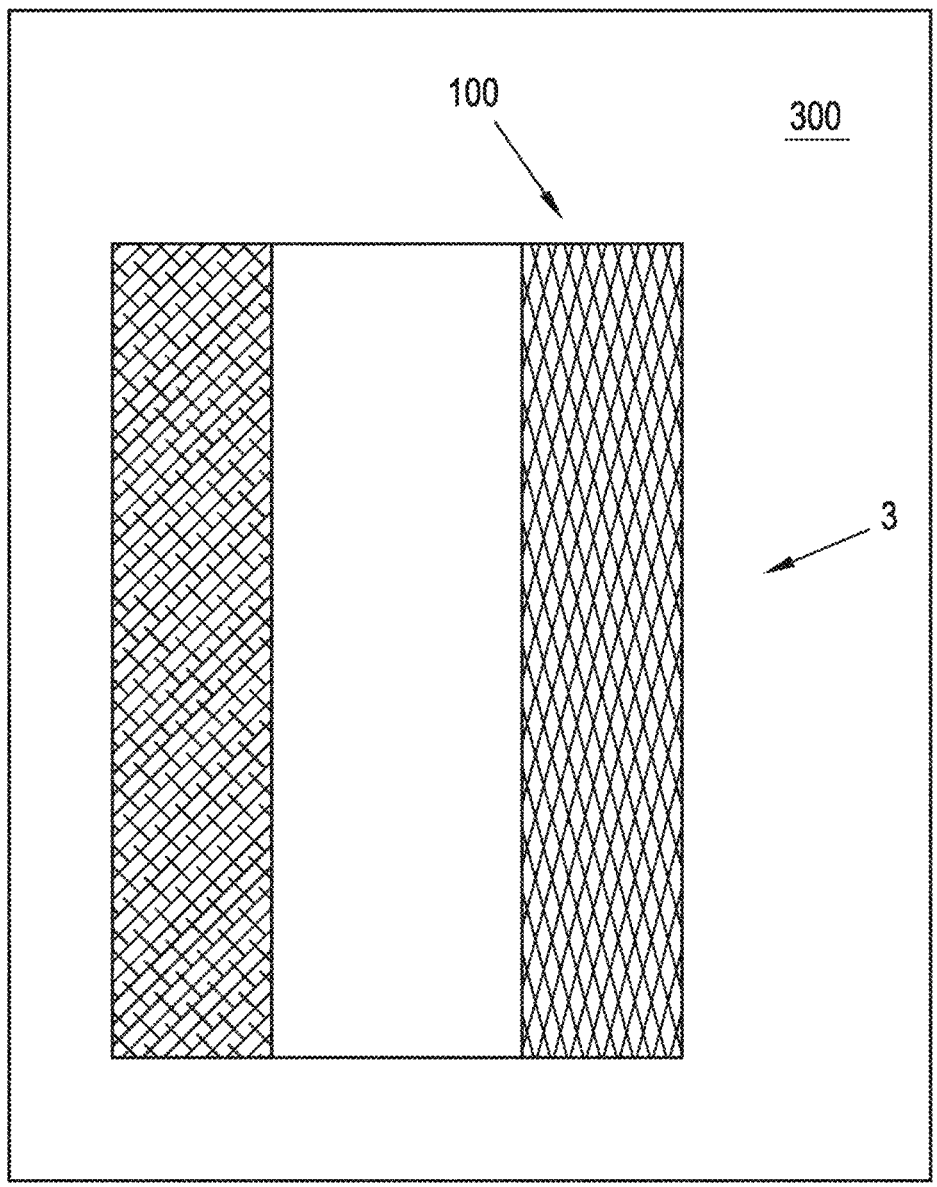

FIG. 5 show a detail view of a precut blank with a coating film as usable for a car seat.

Figure 1:
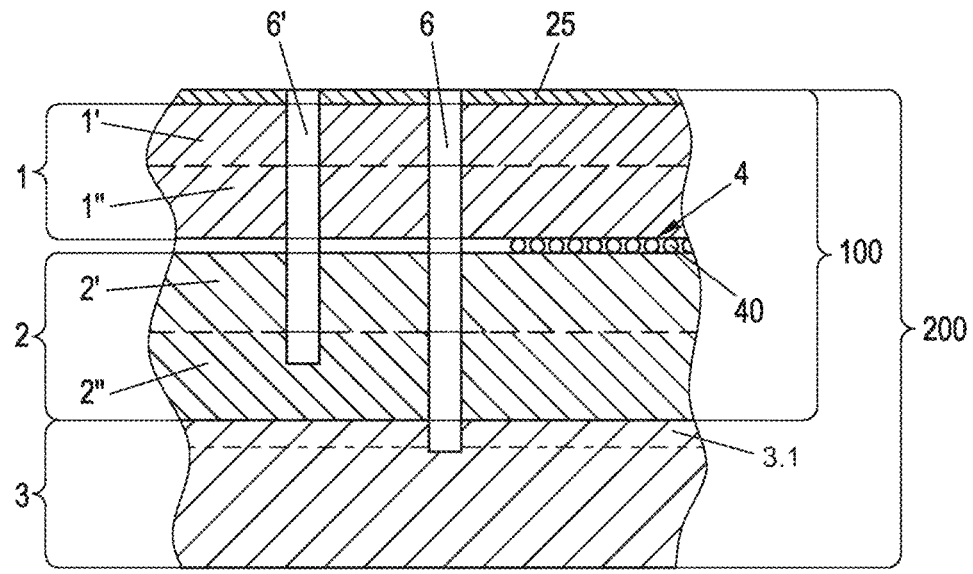
FIG. 1 shows a schematic section through a composite material of the invention.

FIG. 1 shows a section through an inventive composite material 200 having an upper layer 1, a bonding layer 2 and a carrier layer 3. The upper layer 1 may have multiple layers; it especially comprises two layers 1' and 1". The upper layer 1 is bonded to the bonding layer 2 via an adhesive layer 4, which can optionally also be dispensed with. The bonding layer 2 may have a one-layer or multilayer structure, advantageously with 2 layers 2' and 2". The carrier layer 3 is a layer of textile material, for example a weave, a knit or a nonwoven composed of polyester fibers. This textile material may comprise cotton fibers.

The upper layer 1 is a layer of a crosslinked solidified polyurethane dispersion created from an aliphatic polycarbonatepolyurethane and/or polyesterpolyurethane and/or polyetherpolyurethane. The individual layers of the upper layer have essentially the same structure.

The upper layer 1 is non-thermoplastic and advantageously thinner than the bonding layer 2.

The bonding layer 2 is at least one polyurethane layer which is not crosslinked and has thermoplastic properties and may be bonded to the upper layer 1 by an adhesive layer 4, likewise composed of polyurethane.

Figure 3:
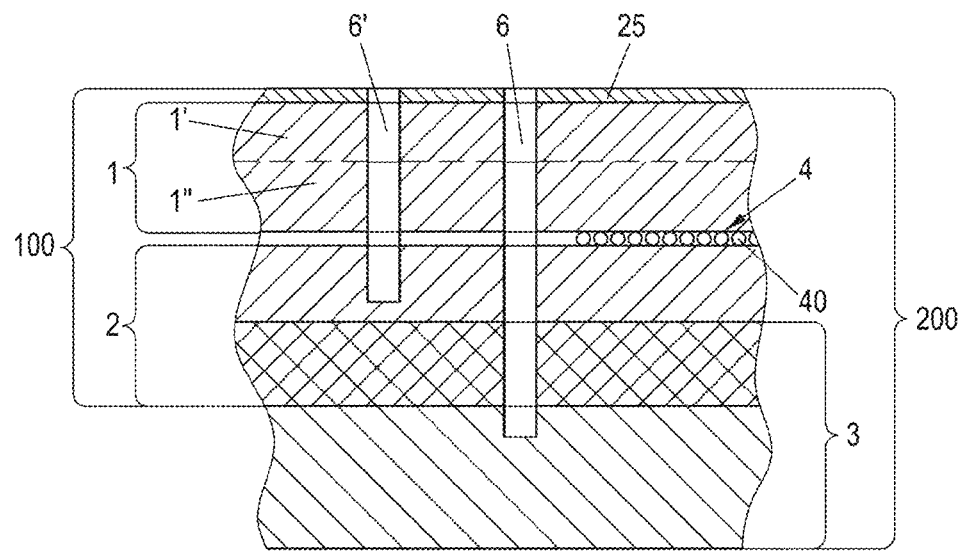
FIG. 3 shows a section through a composite material of the invention.

As shown in FIG. 1, a laser can be used to form, by corresponding removal of material, recesses 6, 6' starting from the surface of the coating film 100 in the composite material 200. Recesses 6' lead from the surface of the coating film 100 into the interior of the bonding layer 2. The recesses 6 pass through both the upper layer 1 and the bonding layer 2 and extend as far as the carrier layer 3 or into it; more particularly, they extend into the carrier layer 3 when, as shown in FIG. 3, it is filled with material of the bonding layer 2 in an edge region 20. These recesses 6, 6' serve for passage of air and or water vapor.

FIG. 1 shows in schematic form how a coating film 100 of the invention is placed on a carrier layer 3. FIG. 3 shows how the coating film 100 has penetrated partly into the carrier layer 3. This penetration region 20 results in an inextricable bond between the bonding layer 2 and the carrier layer 3. The upper layer 1 and the bonding layer 2 are bonded to one another either by a direct bond in the course of or after production thereof by means of heat and pressure or via the adhesive layer 4.

Figure 2:
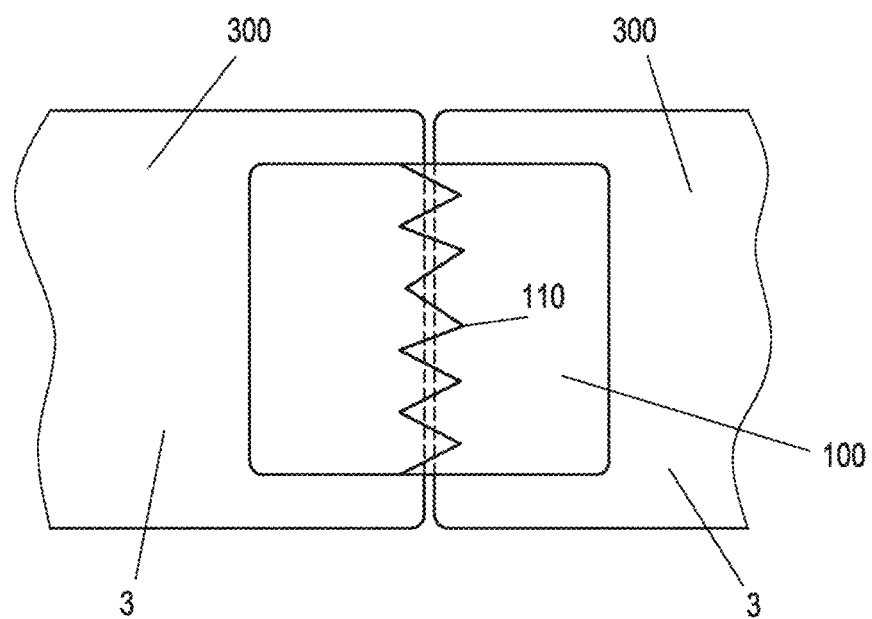
FIG. 2 shows a top view of a precut blank that has been partly provided with a coating film of the invention.

FIG. 2 shows a composite material comprising two precut blanks 300 that are stitched to one another or bonded by a seam 110. Across the seam and in the adjoining regions of the two precut blanks 300, a coating film 100 of the invention has been applied, which covers the seam 110 and the parts of the precut blank that are highly stressed in the planned use in this region.

Figure 4:
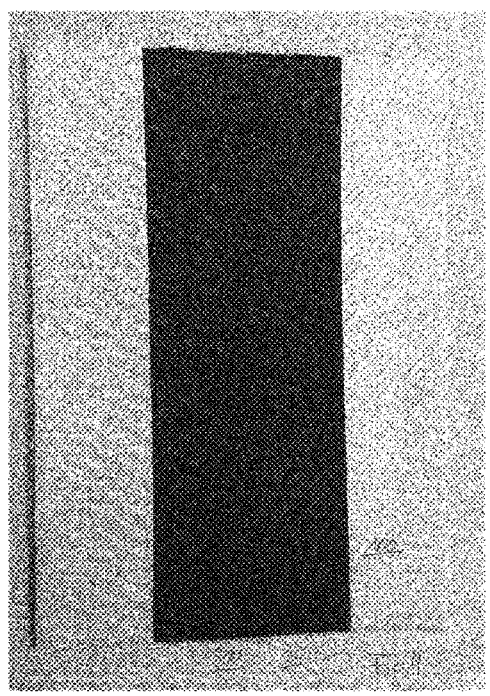

FIG. 4 and FIG. 5 show a detail view of a composite material comprising a precut blank 300 which is covered with a coating film 100, and can form the backrest or seat area of a car seat. The coating film 100 in this case has been provided with different surface structures which may be formed on the template in the production thereof, on which the surface layer 1 or the outer layer 1' of the surface layer 1 is formed. The application of the coating film 100 to the carrier layer 3 or the precut blank 300 does not disruptively alter the surface structure present, if at all.

It is also possible to structure the precut blank 300 provided with the coating film 100 by hot pressing after bonding of the coating film to the precut blank 300, or to emboss a pattern by hot forming of the thermoplastic bonding layer 2. No change in gloss or fine structure of the upper layer 1 is possible after completion and crosslinking of the coating film 100 since the upper layer is a polyurethane layer that does not have thermoplastic properties, whereas the bonding layer 2 is a polyurethane layer having thermoplastic properties which has advantageously been formed from a pelletized polyurethane material by extrusion. However, the upper layer 1 fits elastically to the form of the bonding layer 2.

For a car seat, it has been found to be advantageous when the bonding layer 2 has a thickness of 0.140 mm and the upper layer 1 a thickness of 0.075 mm. The upper layer 1 is non-thermoplastic and the upper layer 1 and the bonding layer 2 each have a hardness of 80 Shore A. The thin non-thermoplastic upper layer 1 in combination with the thermoplastic bonding layer 2 enables any configuration of the surface by hot embossment by means of an embossing roll. The upper layer 1 and the bonding layer 2 were bonded with an adhesive layer 4 of thickness 0.0080 mm. The bonding layer 2 of the coating film 100 penetrated into the carrier layer 3 by 60% of its thickness. Apart from the fact that the composite material 300 produced in this way has optimal use properties, it has fatigue bending characteristics of more than 160 000 bending operations at room temperature and adhesion between layers 2 and 3 of more than 15 N/cm, even after storage under water for 24 hours.

The film of the invention is used, for example, for partial application or coating of textile carrier materials as used in cars. According to the invention, the layer 2 here has a preferred thickness between 0.10 mm and 0.18 mm and, on plastification by means of pressure and heat, depending on the structure of the textile carrier, penetrates into the carrier layer 3 preferably up 60% of its thickness. In the case of coarse-mesh or open weave structures, the layer 2 may also have a thickness of up to 0.25 mm and can be indented almost completely into the carrier layer 3.

In the case of production of sheet material in which the coating film 100 fully covers the carrier layer 3, the bonding layer 2 may have a higher thickness, preferably between 0.2 mm and 0.5 mm.

In the case of abrasion tests which have been undertaken in the same way for the textile material of the carrier layer 3 without coating and with the coating film 100 of the invention (FIG. 4 and FIG. 5), it has been found that, under the same stress, the textile material already had considerable roughening and worn sites, whereas the surface of the coating film 100 showed virtually no changes. FIG. 4 and FIG. 5 show a polyester weave as used for car seats. The weave has been partly covered with the coating film 100. The thermoplastic bonding layer 2 has a thickness of 0.1 mm and has penetrated into the textile carrier 3 to an extent of 90%. The upper layer 1 has a thickness of 0.065 mm. In a Taber abrasion test (DIN 53109, H18 friction wheel) that was conducted in such a way that half the friction wheel ran over the textile material 3 and half over the coating film 100 of the composite material, i.e. the coated part, the weave showed severe damage after 400 cycles, whereas the coated part has only a slight change in the degree of gloss, but otherwise remained undamaged.

The film of the bonding layer 2 has a softening range from about 80 to 165° C. The film remains soft and pasty up to this temperature and is deformable or indentable by pressure; there is no occurrence of through-melting or mobile, free-flowing characteristics without pressure.

It is advantageous for the invention that there is no change in the non-thermoplastic upper layer 1 at a temperature of 195° C., and likewise not in the carrier layer 3 or in the coating 3.1 either. With regard to their physical properties at 195° C., the behavior of these layers is similar to that at room temperature.

It is a further object of the invention to create a composite material in sheet form or a synthetic leather with a PUR coating in which there are no difficulties with the REACH regulations and where occurrence of CO2 is low or zero.

Problems with synthetic leathers having an outer PU layer, a voluminous middle layer and a carrier are caused by the middle layer which is formed from what are called PUR high-solids, PUR prepolymers or a PUR-forming reaction mixture. These materials are liquid to pasty masses. Consolidation of these masses requires temperatures of more than 100° C. This is not just a process disadvantage; the consolidated masses also cause problems with the REACH regulations and the CO2 regulations. These masses form the middle layer of the composite material, i.e. the layer between the textile carrier and the outer layer. Moreover, these masses are non-thermoplastic and thus can be formed only with difficulty by hot embossing.

It is a further object of the invention to create, in a simple and economically viable manner, a material in sheet form that satisfies the REACH regulations, wherein the bond between the carrier layer 3 and the bonding layer 2 is significantly improved, as are the fatigue bending characteristics and the hydrolysis characteristics of the composite material. The surface 1 of the material can be configured as desired by hot embossing by means of an embossing roll, and thickness thereof can be completely or virtually completely maintained to this operation.

According to the invention, a thermoplastic, extruded PU film is used as bonding layer 2. This film 2 is advantageously created from pelletized polyurethane material containing no emigratable substances. This film 2 is bonded to the carrier layer 3 in the heated state in which it is plastic and can flow under pressure, or after contact with a hot plate or roll, optionally with further application of heat and/or pressure.

Contact heating lasts for between 10 and 30 seconds. This heating operation is of good suitability for precut parts, but comparatively uneconomic for the production of sheet material.

It has been found that a film which is advantageously usable as bonding layer 2 can be made to melt or to bond to a textile carrier layer 3 by means of flame treatment, similarly to the case of flame lamination of a polyurethane foam, or by heating by means of infrared sources without contact with a hot plate or hot roll, i.e. indirectly, within a period of less than 2 seconds. As soon as the film has been plastified or made to melt, it can be bonded to the textile carrier layer 3, optionally by means of rolls.

The penetration depth of the bonding layer 2 or film into the carrier layer 3 (FIG. 3) depends on the structure of the carrier layer 3 and on the temperature of the film and the associated tackiness and the melt viscosity. In addition, the penetration also depends on the pressure with which the film 2 is pressed onto or indented into the carrier layer 3.

According to the invention, it may be the case that the bonding layer 2 or the film after extrusion thereof is placed onto or lies on a temporary, flexible carrier, optionally of thickness less than 1 mm, which advantageously has a higher melting point than the temperatures required or is unmeltable at these temperatures, for example a silicone rubber film, a Teflon film, a polyester film, a coated textile carrier material or a release paper. A material of this kind can be used as often as desired as carrier. From this temporary carrier, the softened film 2 is placed onto the carrier layer 3 and optionally pressed on.

According to the invention, the thermoplastic bonding layer 2 may also at first be formed or produced separately from the non-thermoplastic upper layer 1 and then combined or bonded to the upper layer 1 which consists of an aqueous PUR dispersion or of PUR dispersion mixtures and is not meltable. In this case, it is possible to dispense with a temporary carrier, particularly when the upper layer 1 has a thickness between 0.06 and 0.12 mm and a hardness between 75 and 98 Shore A and hence can stabilize the softened bonding layer 2. The softened film 2 bonded to or coated with the upper layer 1 is placed onto the carrier layer 3.

Advantageously, in the case of performance of such process steps, the film or bonding layer 2 has a thickness of 0.2 to 0.6 mm.

It has been found that it is advantageous in accordance with the invention to use, as carrier layer 3, a textile material, preferably a knit or weave, especially consisting of polyester fibers, having a basis weight of 300 g/m² and a thickness of 0.65 mm, and to bond it to a 0.4 mm-thick film as bonding layer 2 which has been heated to 125 to 145° C. by infrared irradiation. The film 2 penetrates between 0.05 and 0.25 mm into the carrier layer 3, or is indented to that degree. An adhesion of 22 N dry and of 18 N wet according to DIN ISO 11644 is achieved. Thus, in an economically viable manner, a firm bond is achieved between the bonding layer 2 and the carrier layer 3, and also an improvement in adhesion. A polyurethane dispersion mixture having a solids content of 40% to 60% by weight of polyurethane is applied as upper layer 1 to the bonding layer 2.

Any PUR primer layer present with a thickness of less than 0.01 mm between the outer layer 1 and the bonding layer 2 is not taken into account in the judgement of layers or judgement.

In the context of the invention, it is also possible first to bond the non-thermoplastic upper layer 1 to the thermoplastic bonding layer 2 and only then to bond the bonding layer 2 and the carrier layer 3.

In this case, the upper layer 1 can be produced with the desired look and then processed, and may have one or two layers. The upper layer 1 may bear a thin, at best non-thermoplastic finish layer 25 of a PUR dispersion having a thickness of less than 0.01 mm.

According to the invention, the film used as bonding layer 2, in the plastic, tacky state after leaving the extruder, may be combined with the desired ultimate carrier layer 3 by placing it on and optionally indented into the carrier 3 in the desired manner by means of one or more rolls optionally having an anti-adhesive finish on their surface. This procedure is not just economically advantageous; it also leads to inextricable bonds, particularly when the melting point of the film 2 is between 125 and 175° C., preferably between 135 and 155° C. The carrier layer 3 is advantageously a textile material, especially a knit or weave made of polyester fibers.

As is well known, inexpensive thermoplastic PUR films based on aromatic polyester are not particularly hydrolysis-stable. According to the invention, however, inexpensive PUR films that have been created entirely or partly on the basis of aromatic PUR also lead to good hydrolysis stability of the finished composite material by providing the carrier 3 with a thin, hydrolysis-resistant coating 3.1 (FIG. 1) having a thickness of 0.05 to 0.3 mm. The hydrolysis-resistant coating 3.1 may consist of aliphatic polyurethane based on polyether or polyester, of polyacrylate, of a layer of mixtures of these two materials, of flexible PVC or of PVC-containing copolymers. This is particularly advantageous for textile material, especially having an open structure. The coating 3.1 prevents the penetration of the film 2 into the carrier layer 3. The coating 3.1 is dry and bonds to the heated film 2. The coating 3.1 consists either of solidified, optionally crosslinked PUR dispersions or PUR mixtures. It is advantageous when the film 2 has a partly crystalline structure. If the coating 3.1 consists of a polymer such as polyacrylate or of a PVC-containing copolymer, an appropriate primer is a thin PUR dispersion adhesive layer.

It is advantageously possible to apply a thin primer layer of less than 0.01 mm of a PUR adhesive dispersion (not shown in the drawing) to the solidified coating 3.1 on the carrier layer 3. The bonding layer 2 can be applied in the manner described above to the carrier 3 thus precoated by plastifying the film or applying the still-soft film immediately after it has left the extruder.

The thin coating 3.1 prevents or makes it difficult for moisture to reach the bonding layer 2 through the carrier layer 3. The upper layer 1 formed with high-quality PUR dispersions prevents the ingress of moisture from this side, and so the composite material does not undergo any significant change in its consolidation properties, if any, even after hydrolysis aging.

It is particularly advantageous when the film 2 has a broad softening point and is not mobile even at the melting point, for example polyamide or polystyrene. At temperatures of 75 to 110° C., its surface does become tacky, but it requires pressure to bond with the layer 3. With increasing temperature, the film 2 becomes tackier and pastier. Before its respective melting point, it is at its tackiest and requires little pressure for bonding to the carrier layer 3.

The invention is illustrated in detail by examples:

EXAMPLE 1 FOR A COMPOSITE MATERIAL AS SLAB MATERIAL

An extruded TPU film 2 based on aliphatic polyester, having a Shore A hardness between 70 and 85 of 78 Shore A and a thickness of 0.4 mm, is heated at a temperature of 130° C. in a heating plate press and pressed at a pressure of 2 bar with a polyester knit as carrier layer 3 having a basis weight of 300 g/m$^2$. The polyester knit contains 25% by weight of cotton fibers. At the temperature of 130° C., the TPU film becomes tacky and highly viscous/pasty. The pressure and the temperature are used to control the penetration depth into the carrier layer 3 and adjust them to the desired value of 45% of the thickness of the film 2. The residence time in the hot press is 10 to 20 s. After removal from the press, the composite material is dressed in the reverse process, meaning that the upper layer 1 which is then applied is created on a structured substrate, for example on a negatively structured silicone template, on a negatively structured release paper or on a laser-structured Teflon or polypropylene slab, and bonded to the film 2. All surface executions are possible, for example grain leather, velour leather, textiles or a technical appearance such as sandpaper.

EXAMPLE 2

Pelletized TPU material is plastified in an extruder and extruded to a film from a slot and placed onto a textile carrier layer 3, for example onto a knit or weave, in the plastic state, and optionally lightly pressed on. The TPU film has a Shore A hardness of 82, which is thus between 70 and 98 Shore A. It consists of an aromatic polyesterpolyurethane, has a thickness of 0.45 mm and is 20%, optionally 5% to 25%, of its thickness incorporated into the carrier layer 3. On the side opposite the textile carrier 3, the film 2 is bonded to the upper layer 1 which has been formed from a non-thermoplastic polyesterpolyurethane dispersion. The upper layer 1 has a thickness of 0.08 mm and a Shore A hardness of 88. This upper layer 1 is applied to the film 2 by direct application by means of knife-coating or spraying and, after consolidation, it is embossed. For this purpose, it is heated and receives the desired structure with an embossing roll. Optionally, the embossing roll itself has been heated to a temperature between 100 and 180° C. The thin, non-thermoplastic coating can be embossed efficiently by means of heat and pressure in combination with the thicker thermoplastic bonding layer 2.

EXAMPLE 3

A polyester knit of weight 250 g/m$^2$ with an open knit structure is provided with a thin coating 3.1 having a thickness of 0.05 mm. The coating 3.1 consists of a solidified polyurethane dispersion having a solids content of 50% by weight. The coating 3.1 also contains 40% by weight of polyacrylate having a solids content of 50% by weight. This layer has penetrated into the carrier layer 3 by 0.07 mm, i.e. between 0.05 and 0.1 mm. After it has solidified, it is bonded to the TPU film having a thickness of 0.4 mm in such a way that the TPU film 2 is heated to a temperature of 145° C. by means of infrared rays and the two parts are combined at this temperature. After cooling, the composite material can be provided with the upper layer 1 either directly or indirectly (reverse process).

The most economically viable method is to create the TPU film by extrusion and to combine it, in the still-plastic state, with the carrier 3 desired in each case.

EXAMPLE 4

Leather, especially split leather, is provided in accordance with the invention with a coating 3.1 of maximum thickness 0.15 mm, onto which the TPU film 2 provided with the upper layer 1 is then thermally ironed. This procedure is particularly suitable for safety and athletics footwear.

The TPU film 2 in combination with the non-thermoplastic upper layer 2 has excellent fatigue bending properties at sub-zero temperatures. The composite material is also extremely abrasion-resistant. 4000 cycles in the Taber method for wear resistance with H18 friction wheel (DIN EN ISO 17076-1) are fulfilled easily, whereas conventionally dressed leathers do not withstand more than 400 cycles.

This invention is of particular interest for Tier 1, which manufacture interiors for cars, trucks and buses, especially seats, where textile materials are subject to severe wear at sites under stress.

The invention claimed is:

1. A process for producing a composite material having an optionally multilayer upper layer, a bonding layer bonded thereto and optionally having multiple layers, and a carrier layer bonded to the bonding layer wherein:
    the carrier layer used is an optionally coated textile material or an optionally coated leather, and is bonded to the bonding layer;
    the bonding layer used is an uncrosslinked, thermoplastic polyurethane layer having a thickness between 0.080 and 0.500 mm, and is bonded to the upper layer; and,
    the upper layer used is a polyurethane upper layer which has a one-layer, or a two-layer structure with an outer layer and inner layer, does not have thermoplastic properties and has an amorphous structure, the polyurethane upper layer being thinner than the bonding layer;
    wherein the thermoplastic polyurethane bonding layer is applied to the underside of the upper layer or to the topside of the carrier layer; and,
    has a Kofler bench melting point between 95 and 165° C.;
    has a Shore A hardness between 70 and 98;
    is based on aliphatic and/or aromatic polyesterpolyurethane and/or polyetherpolyurethane having a crystalline or semicrystalline structure;
    contains up to 5% by weight of color pigments or is transparent; and,
    has fatigue bending characteristics according to DIN EN ISO 5402 of at least 125000 bending operations at standard temperature.

2. The process as claimed in claim 1, wherein the thermoplastic polyurethane bonding layer and the upper layer that has been bonded thereto are applied only to partial regions of the carrier layer which is optionally composed of multiple, optionally stitched pieces, or to the carrier layer in the form of a precut blank.

3. The process as claimed in claim 1, wherein the carrier layer used is a weave, knit, polyester nonwoven or coated leather.

4. The process as claimed in claim 1, wherein the upper layer is applied or attached to the thermoplastic polyurethane bonding layer bonded to the carrier layer, and in that a finish layer is optionally applied to this upper layer after embossment thereof.

5. The process as claimed in claim 1, wherein:
textile materials that are free of silicones, waxes or separating agents; and/or,
a laid scrim made of synthetic fibers having a basis weight between 5 and 20 $g/m^2$ is embedded between the thermoplastic bonding layer and the upper layer; and/or,
4% to 20% by weight of flame-retardant additives, optionally aluminum hydroxide, are added to the thermoplastic polyurethane bonding layer and/or the upper layer; and/or,
a finish layer having a maximum thickness of 0.010 mm and/or a multicolor print having a thickness of less than 0.010 mm is applied to the outer surface of the upper layer; and/or,
the upper layer and the bonding layer are formed with a Shore A hardness which is equal or different by not more than 10%; and/or,
the upper layer and an adhesive layer are formed together with a smaller thickness than the thermoplastic polyurethane bonding layer.

6. The process as claimed in claim 1, wherein, for formation of a leather substitute material, the upper layer is applied to a structured substrate, and the thermoplastic polyurethane bonding layer that has optionally already been bonded to the carrier layer is applied thereto, or in that a textile carrier layer in sheet format is bonded to the thermoplastic polyurethane bonding layer with supply of heat and pressure or by use of a contact or pressure-sensitive adhesive, and in that, on the topside thereof, direct coating is effected with a dispersion to form an upper layer which, after solidification, is embossed by removal of water by means of heat, at a temperature between 90 and 160° C. and under pressure, or by means of heat in a vacuum method.

7. The process as claimed in claim 1, wherein the thermoplastic polyurethane bonding layer is applied to the carrier layer together with the upper layer and the layers are bonded with application of heat and/or pressure.

8. The process as claimed in claim 1, wherein the water vapor permeability in the upper layer and the thermoplastic polyurethane bonding layer is adjusted with a laser in the upper layer and the thermoplastic polyurethane bonding layer.

* * * * *